June 13, 1967 H. MÜLLER 3,324,667

REFRIGERATOR CABINET WITH THERMOELECTRIC COOLING MEANS

Filed July 10, 1963 4 Sheets-Sheet 1

Inventor:

Heinz Müller

Inventor:

Heinz Müller

Jnventor:
Heinz Müller

Inventor:
Heinz Müller

United States Patent Office 3,324,667
Patented June 13, 1967

3,324,667
REFRIGERATOR CABINET WITH THERMO-ELECTRIC COOLING MEANS

Heinz Müller, Erlangen, Germany, assignor to Siemens-Electrogerate Aktiengesellschaft, Berlin, Germany, a corporation of Germany Filed July 10, 1963, Ser. No. 294,084
Claims priority, application Germany, Aug. 3, 1962, S 80,739; Sept. 21, 1962, S 81,604
15 Claims. (Cl. 62—3)

My invention relates to thermoelectric devices for heating, cooling or current-generating purposes.

It is known to provide such devices with a thermoelectric battery block in which a multiplicity of thermocouples are combined to a single structure, all couples having their operationally hot junctions on one side of the block and all of the operationally cold junctions on the opposite side. Heat-exchanging means are provided at the heat-consuming and heat-dissipating block sides respectively. Used as heat-exchanging means are bodies of metal, usually provided with large-surface vanes or fins. Also known are thermoelectric devices in which the transportation of heat from and to the block sides is effected by evaporation and condensation of an auxiliary medium. For this purpose the hot and cold sides of the block are joined with respective evaporator and condenser vessels.

When using purely metallic heat-exchanging means, an electrically insulating layer must be inserted between the heat-exchanging metal and the conducting bridge pieces that interconnect the individual legs of the thermocouples in the block, but the interposed insulation must not interfere with good heat conductance. In cases where the heat-flow densities are high, for example higher than 10 watt/cm.$^2$, as is the case for example on the hot side of such devices if the length of the thermocouple legs is short (namely 3 mm. or less), the temperature jump occurring in the insulating layer is sometimes uneconomically high. To prevent this, it has been attempted to directly cool the electrically series-connected couple legs of a block by means of water. Due to the conductance of water which though slight is virtually always existent, the occurrence of electrolysis cannot be prevented. However, an at least partial series connection of the legs must be reserved because the voltage at the individual legs is very small.

The above-mentioned difficulties can be avoided in devices in which the transportation of heat is effected by evaporation and condensation of an auxiliary medium. In such a system, the above-mentioned temperature jump at the boundary between the contact bridges of the block and the heat exchanger is nearly independent of the heat-flow density. However, the known heat-exchanger systems of this type are much too complicated, too large and too expensive, particularly for thermoelectric devices of relatively small rating and small size. This is because the known devices, in analogy to the conventional refrigerating machines operating with evaporation and condensation, comprise a closed circulation system in which a vessel forms the evaporator and is connected by suitable tubing with a second vessel operating as condenser. Consequently such a system requires three independently operating heat-transporting devices, namely the thermoelectric device proper and on each of the cold and hot sides the system operating with evaporation and condensation. This is economically and for spacial reasons not acceptable for many purposes.

It is an object of my invention, relating to a block-type thermoelectric device for heating, cooling or current-generating purposes, to minimize or avoid the dependence of the temperature jump upon the heat-flow density with the aid of much simpler and less space-consuming means than heretofore needed.

It is another object of my invention, relating to a battery block of thermocouples, preferably a Peltier block, to permit the flow of heat through the block only in the proper operating direction but to substantially prevent a reverse flow of heat through the block when the block is electrically switched off, thus providing an asymmetrically heat-conducting device for such purposes as to prevent undesired heating of objects to be cooled or to reduce losses due to reverse heat flow during operational pauses of intermittent operation.

According to a feature of my invention, a container is joined with the thermocouple block on the hot-junction or cold-junction side and is partially filled with a quantity of evaporative fluid heat-exchange medium such as Freon which defines in the container a vapor space above a liquid-containing space, the junction side of the block being in heat-conductive contact with the medium in the container, and I further provide heat-exchange structure spaced from the block in heat-contact with the medium within the container and extending to the external side thereof.

According to another feature of my invention, the thermocouple block is inserted between two insulating containers or in a partition of an insulating container structure so that all operationally cold junctions on one side of the block are located in one container chamber and all operationally hot junctions of the blocks are located in another chamber on the opposite side of the block or partition, each of the two containers or container chambers forming respective evaporation-condensation spaces for an auxiliary heat-transfer medium.

As a result, there is provided a relatively small, self-contained thermoelectric device which eliminates the above-mentioned difficulties and complications of the known systems. This is essentially due to the fact that the heat-receiving side of the block or the heat-issuing side or both are associated with an evaporation-condensation system constituted by a single container or chamber simultaneously forming an evaporator as well as a condenser. The heat flow through such a thermoelectric device occurs, for example, from one external heat-exchanger on one side of the block to the auxiliary medium in one chamber, thence to the block and to the auxiliary medium in the other chamber and to the external heat-exchanger on the other side. As a result, the evaporation of medium required for the transportation of heat takes place with a heat-transfer coefficient which is virtually independent of the heat-flow density. For this reason it is preferable to take care that the heat-consuming parts, namely the condensation surfaces of the container or block, are given a larger total surface than the heat-dissipating parts, in order to minimize at this location the temperature difference which here increases with the heat-flow density because of the constant heat-transfer coefficient.

According to another feature of my invention it is preferable to cover and seal the two container portions or chambers at the sides facing away from the block, by plates of good heat-conducting metal such as cover plates of copper. Furthermore, the components of the block and/or of the cover plates that are in contact with the enclosed auxiliary medium are preferably provided with surface-increasing means such as ribs or fins.

The block is preferably coated with insulating material or embedded in insulating casting material only on the heat-dissipating side, whereas the predominant portion of the thermocouples and the conducting bridges between the couple legs on the heat-receiving side freely protrude into the adjacent evaporation-condensation chamber. The latter parts, furthermore, are preferably arranged to come into contact only with the vaporous phase of the auxiliary medium. A condensation in this case takes place only at the coldest spots. In this manner, the manufacture of the device is facilitated, the manufacturing time needed is shortened, less insulating material is required, and losses by undesired heat-transfer within the block are reduced because the vaporous phase of the auxiliary medium generally is very poor heat-conductor. This applies to the use of the now generally employed refrigerating media, such as those available in the trade under the name "Freon" (or "Frigen").

According to another feature of my invention, a particularly advantageous device is obtained by giving the two containers or container portions a displaced arrangement with respect to the position of the thermocouple block. This makes it possible to largely suppress the occurrence of heat-flow in opposition to the operational heat-flow direction in the block, when the block is electrically switched off. Such thermally asymmetrical transfer or valve (rectifier) action is due to the fact that the displaced arrangement of the chambers offers no appreciable cross section of good heat-conducting material for a reverse flow of heat if the liquid quantity of the auxiliary medium in one chamber is adjacent to that portion of the other chamber that is filled only with vapor of the auxiliary medium. Such a heat-valve performance can also be obtained in cooling devices with a substantially horizontal position of the thermocouple block, by giving the partition in which the Peltier block is mounted an inclined direction so that it forms an acute angle with the adjacent top and bottom walls of the container chambers.

The above-described suppression of a reverse heat flow when the thermoelectric device is electrically switched off, this being achieved by a stagger arrangement of the containers for the auxiliary medium so that the liquid phase cannot contact the thermoelectric device proper, is not limited to devices containing a block in the partition of a twin container, but is generally of advantage for any thermoelectric apparatus whose heat-receiving side cooperates with an evaporation-condensation system.

The foregoing and other objects, advantages and features of my invention will be apparent from, and will be mentioned in, the following in conjunction with embodiments of thermoelectric devices according to the invention illustrated by way of example on the accompanying drawings in which.

The same reference characters are applied in all illustrations to corresponding components respectively.

Figure 1:
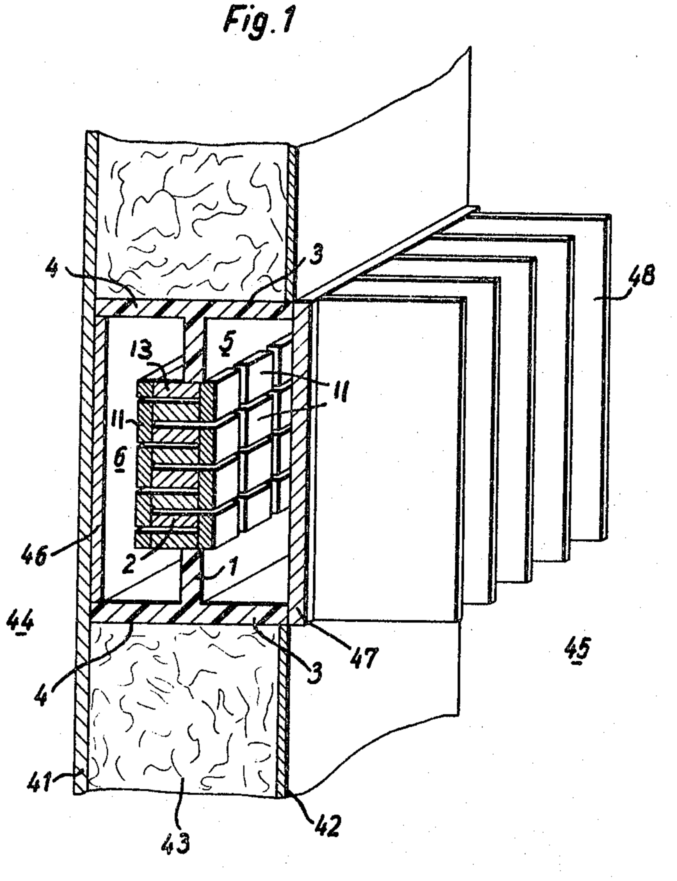
FIG. 1 shows in perspective a vertical section through the wall of a refrigerator cabinet with an inserted thermoelectric cooling device.

The wall portion of the refrigerator cabinet shown in FIG. 1 comprises an inner metal sheet 41, an outer metal sheet 42 and a layer of heat insulation 43 between the two sheets. The interior space of the refrigerator to be cooled is denoted by 44. The outer space to which heat is to be dissipated is denoted by 45. Inserted into the refrigerator wall is a container structure of insulating material composed of a partition 1 and lateral walls 3 and 4 above and below the partition. The partition 1 and the walls 3 form together a container or box chamber 5 on one side of the partition. The walls 4 form a corresponding chamber 6 on the opposite side of the partition. The twin container structure consists preferably of synethetic plastic, for example epoxy resin, and is preferably made of a single piece of material.

The two container portions or chambers 5 and 6 are open only at the sides adjacent to the respective metal sheets 41 and 42, and these sides are covered and sealed by means of metal plates 46 and 47 preferably of copper.

The thermoelectric block 2 is composed in known manner of a large number of alternately p-type and n-type legs such as the one denoted by 14. Each two adjacent legs are electrically and thermally connected with each other by a contact bridge 11 of copper. The thermocouples thus formed are all electrically connected in series by the contact bridges 11. When voltage is applied to the terminal points of this series, all junctions and consequently all of the contact bridges 11 on one side of the block assume a higher temperature than all of the junctions and contact bridges 11 located on the opposite side of the block. Such thermocouple blocks, particularly for cooling purposes (Peltier blocks) are known as such and are also described in the copending applications of Wolfram Blumentritt, Ser. No. 163,975, filed Jan. 3, 1962, now Patent No. 3,111,813; and Heniz Müller, Ser. No. 164,079, filed Jan. 3, 1962, now Patent No. 3,191,391.

The thermocouple block 2 is inserted in an opening of the partition 1 so that the operationally hot junctions and contact bridges are all located in the chamber 5, and the operationally cold contact bridges and junctions are all located in the chamber 6.

The cover plate 46 is in heat-conducting face-to-face contact with the metal sheet 31 facing the interior of the cabinet. The metal plate 47, likewise of good conducting metal, is provided with external fins 48 for intensive heat-exchange with the ambient air.

Cover plates of metal for closing the container chambers are generally preferable if the space or the quantity of material to be heated or cooled is relatively small so that heating or cooling can be effected by direct thermal contact with the plate structures. However, the closures of the container chambers may also consist of non-conducting metal or insulating material if heat or cooling systems of different type are provided such as the one described below with reference to FIG. 5.

Figure 2:
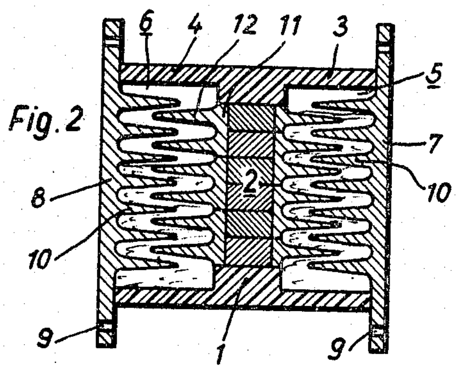
FIGS. 2 to 5 show vertical sections through respectively different embodiments of thermoelectric devices with a vertical arrangement of the thermocouple block.

In the embodiment shown in FIG. 2, the two open sides of the twin-container structure are covered by respective metal plates 7 and 8. The plates have bores 9 for suitable fastening means, such as screw bolts, for attachment of the device to a body to be heated or cooled. The inner sides of the metal plates 7, 8, facing the interior of the adjacent container chamber 5 or 6, possess a ribbed surface so as to form inwardly projecting fins 10 which provide a largest feasible heat-exchanging surface for the enclosed evaporation-condensation system. For the same reason, the contact bridges 11 of the thermoelectric block 2 are provided with outwardly protruding ribs or fins 12 in staggered relation to the fins 10 of the cover plates. The two container chambers 5 and 6 are filled with a suitable auxiliary medium 11 as generally employed as a refrigerant, such as Freon. In this case, the heat-dissipating side of the Peltier block 2 faces the metal plate 7.

Figures 3, 4, 5, 6:
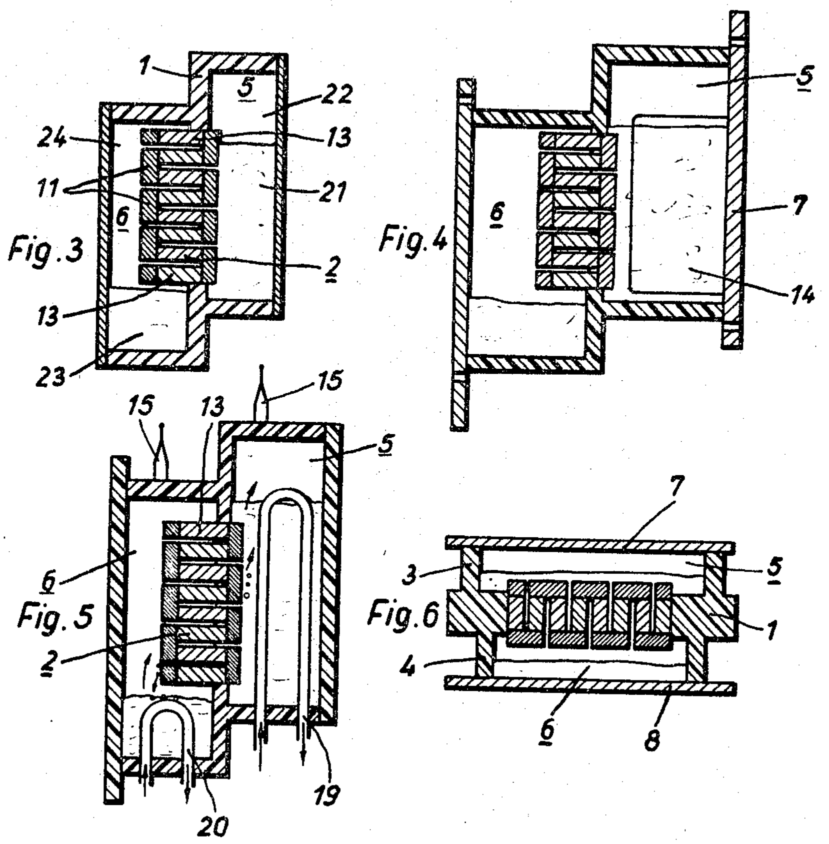
FIGS. 6 to 8 show respectively vertical sections of embodiments in which the thermocouple block is arranged substantially horizontally.

In the thermoelectric device shown in FIG. 3, the container portions 5 and 6 are arranged in displaced relation to each other. The container portion 5 is associated with the heat-dissipating side of the block 2. The liquid phase of the auxiliary medium is denoted by 21. The container portion 5 is so positioned relative to the block 2 that the liquid phase 21 in container portion 5 reaches up to the upper thermocouples 13. Above the level of the liquid phase 21 in container portion 5 there remains sufficient space 22 for the vaporous phase of the auxiliary medium. On the heat-receiving side of the block 2, the container 6 is located lower than the container 5 to such an extent that the liquid phase 23 of the auxiliary medium is located below the lowermost thermocouple 13 of the block 2 so that all of the couple legs and connecting bridge pieces 11 on this side are located in the upper space 24 available for the vaporous phase. The two liquid-filled spaces in the respective container chambers are thus kept substantaill̃y non-adjacent to each other. Consequently when the thermoelectric device is electrically switched off, no appreciable heat flow can occur in opposition to the heat-transporting direction of the block 2 when the latter is in electrical operation.

The block 2 is not completely embedded in casting resin or other insulating material on the cold, heat-consuming side in container portion 6. The thermocouples 13 protrude more into the container portion 6 than into the portion 5. This is possible because the connecting bridge pieces 11 and the couple legs 13 on the cold side come into contact only with the vapor of the auxiliary medium but are not in direct contact with the liquid phase 23. Since condensation takes place always at the coldest spots, namely at the contact bridges 11 in container portion 6, the thermocouple legs 13, being at a higher temperature, have no appreciable effect upon the condensation process.

FIG. 4 illustrates a different embodiment based upon the same principle as FIG. 3. In this device, the surface available for condensation on the heat-dissipating side in container portion 5 is greatly enlarged by the addition of vertical vanes 14 on the cover plate 7.

In the embodiment according to FIG. 5, heat is supplied to the Peltier block 2 and dissipated therefrom by means of respective circulation systems for water or brine, which comprise tubes 19 and 20. However, the tubes are not in direct contact with the block but extend through the liquid-filled spaces in the respective container portions 5 and 6. The water circulation tube 19 serves for cooling the block whose heat is transmitted to the cooling water by evaporation-condensation of an amount of Freon in container portion 5. The tube 20 carries water to be cooled by the thermoelectric system. This water issues its heat in container portion 6 through the auxiliary medium to the block 2. Denoted by 15 in FIG. 5 are fused-off nipples for filling the necessary quantities of auxiliary medium into the respective container portions 5 and 6. In other respects, the embodiment of FIG. 5 corresponds to the one described above with reference to FIG. 3.

Figure 7:
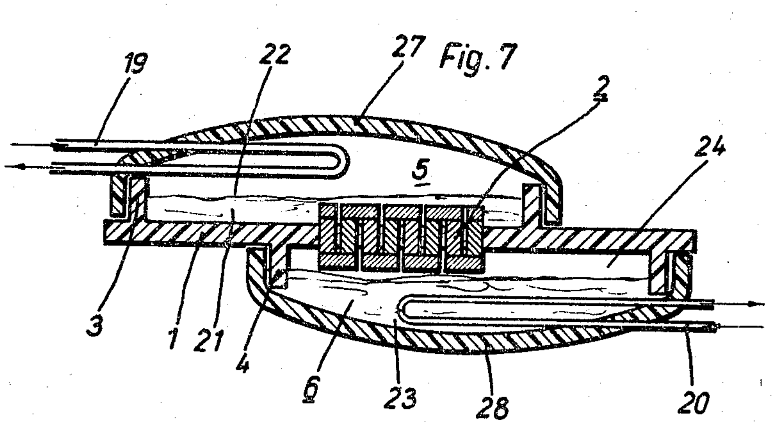
Figure 8:
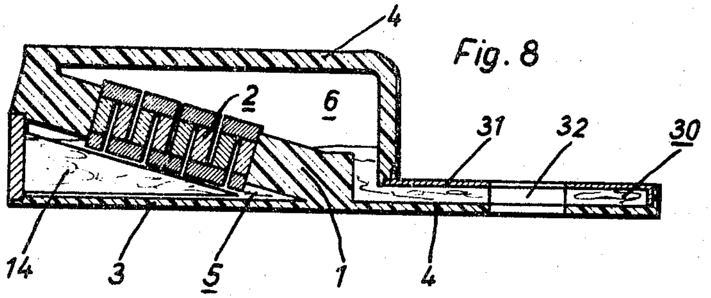

FIGS. 6, 7 and 8 illustrate embodiments which largely correspond to those described above except that the cooling block is arranged horizontally or substantially horizontally. FIG. 6 is otherwise in accordance with FIG. 1. FIG. 7 corresponds essentially to the embodiment described above with reference to FIG. 3. A comparison of the illustration shows that the advantage afforded by the displaced arrangement of the two container portions is also realizable in a horizontal operating position of a Peltier block. The supply and dissipation of heat with the aid of circulation tubing 19, 20, shown in FIG. 7 in analogy to FIG. 5, permits closing the two container portions 5 and 6 by cover parts consisting of insulating material. In the embodiment of FIG. 7, these two closures are shaped as caps 27 and 28 of insulating material which are gas-tightly joined with the insulating container structure 1, 3, 4, for example by cementing.

Figure 8A:
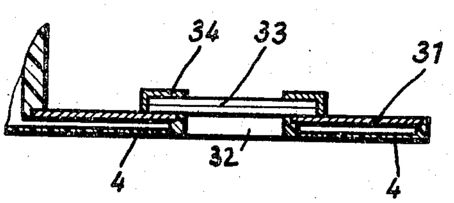
FIG. 8*a* shows more in detail a portion of FIG. 8.
Figure 8B:
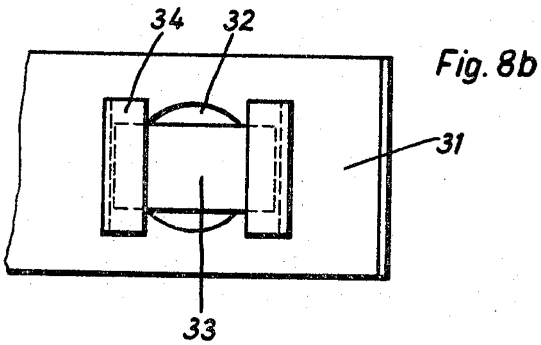
FIG. 8*b* is a plan view corresponding to FIG. 8*a*.

FIGS. 8, 8*a* and 8*b* show an embodiment in which the active cooling surface of the device is located beside the thermoelectric block and most of the other components. This is desirable, for example, if temperature-sensitive objects are to be inspected through a microscope. The cooling surface in such cases must be formed by a thin plate adapted to the object-supporting table of the microscope. For this purpose, the Peltier block 2 in the device according to FIG. 8 is inclined at an acute angle to the horizontal plane on the insulating partition 1 of a housing structure. The wall portions 3, 4 which, together with the partition 1, form the two chambers 5 and 6 extend at an acute angle to the partition. A flat cooling surface structure, adapted to the object carrier, has its bottom formed by the container wall 4 whereas the upper side is constituted by a metal plate 31 with a circular opening 32 in the center. The plate 31, shown more in detail in the sectional view of FIG. 8*a* and in the top view of FIG. 8*b*, is provided with fastening means 34 for the object 33 or an object-carrying slide. The fastening means 34 preferably consist of metal to improve the dissipation of heat from the object to the cooling device.

It will be understood that thermoelectric devices of the type described above with reference to FIGS. 3 to 8 in effect constitute an asymmetrically heat-conducting member or heat valve, comparable to the electrically asymmetrical operation of a rectifier, which secures heat flow through the thermoelectric device only in the proper operational direction but prevents reverse heating of the cold heat exchangers from the side of the hot junction when, for example, a Peltier battery is electrically switched off. As a result, the losses otherwise occurring during intermittent operation are reduced.

While in the embodiments so far described, the two evaporation-condensation chambers 5, 6 that essentially cooperate in the thermal rectifying performance just described are formed by a single container structure, it is often preferable, according to another feature of my invention, to design each of these two chamber structures as an individual structural unit. Such a unit can readily be made selectively attachable to the cold or hot junction side of a thermoelectric block. Such a unit may then constitute an intermediate component between a Peltier block and a heat exchanger on the cold or hot side of the equipment, such heat exchangers being constituted, for example, by the interior of a refrigerator or a cooler in an air-conditioner, or the heat exchanger may be formed by an air-cooled metal structure provided with cooling fins.

A heat-flow valve unit as just mentioned may be mounted only on the cold side of a Peltier block in which case, however, the operation of the cooling system possesses increased thermal inertia because of the increase in mass and heat capacity on the cold side. It is preferable, therefore, to provide a heat-valve unit on the hot-junction side. In this case the cold side operates more rapidly, whereas the increased inertia on the hot side is of minor significance.

The insulating housing for containing the vaporizable auxiliary transfer medium in a heat-valve unit of the above-mentioned kind may be given the shape of a substantially prismatic box. In many cases, however, it is preferable to place the front wall of the housing at a height different from that of the opposite wall so that the intermediate connecting walls have inclined or parallelogram shape. In this manner the heat transport for the liquid medium can be reduced.

In other respects, a thermocouple block equipped with one or two heat-transfer units may be employed and mounted in the same manner as the embodiment described in the foregoing with reference to FIGS. 1 and following. For example, such a composite block and transfer unit assembly may be mounted into the insulating wall of a refrigerator cabinet, the insulating vessel with heat-transfer medium on the cold side of the Peltier block being in contact with the inner side of the cabinet wall, whereas the corresponding unit vessel on the hot side is located at the outer surface of the cabinet wall for dissipation of heat to the ambient air.

Figures 9, 10, 11:
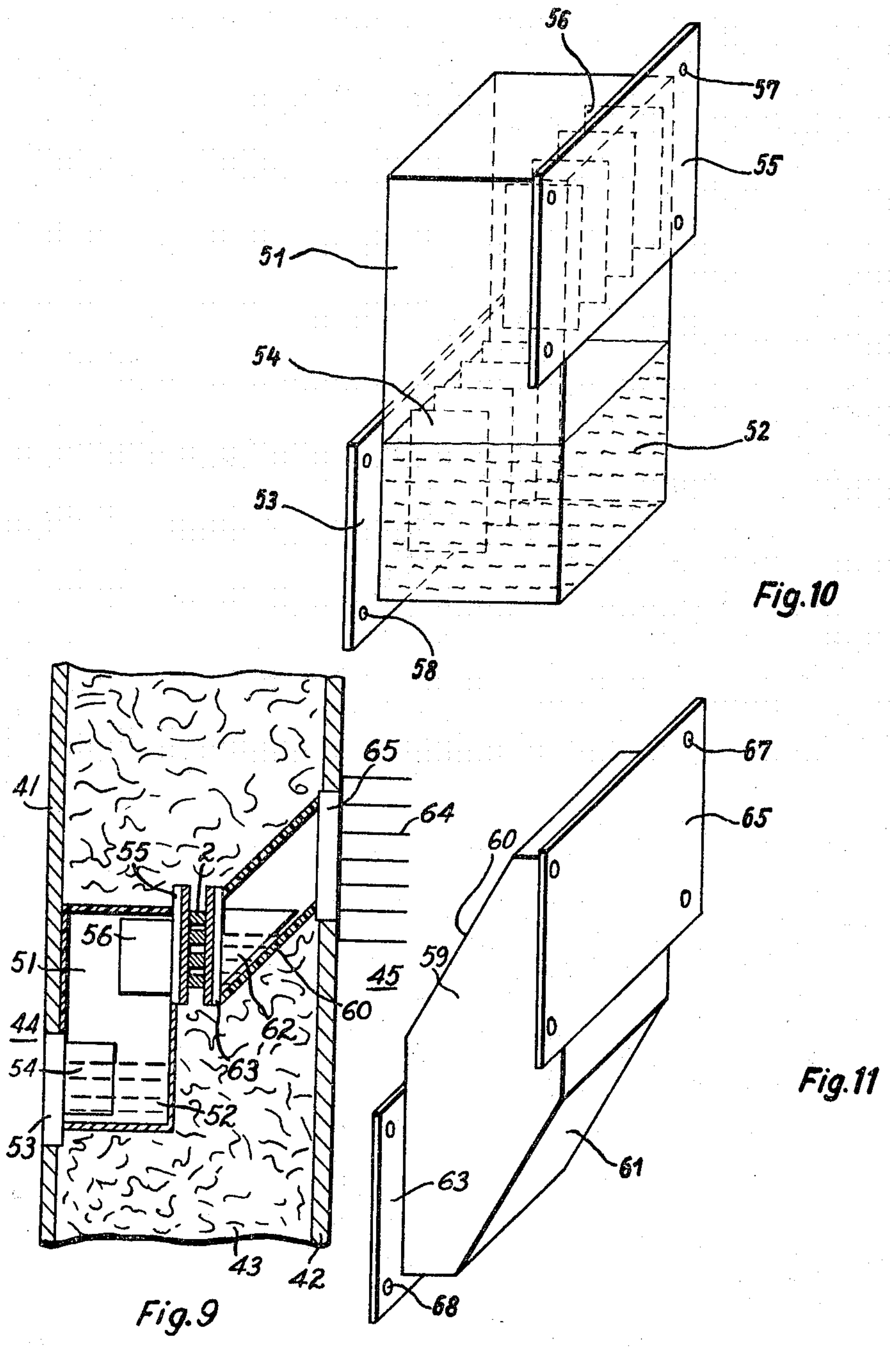
FIG. 9 is a vertical section through the wall of a refrigerator cabinet containing a Peltier block as part of a thermoelectric device according to the invention.
FIGS. 10 and 11 show in perspective two container structures which form part of the device according to FIG. 9.

An embodiment of the type just mentioned is schematically illustrated in FIG. 9.

FIG. 9 is similar to FIG. 1 in showing the heat-insulated wall of a refrigerator cabinet composed of an inner metal sheet 31 adjacent to the cabinet interior 44 and an outer metal sheet 42, the interspace being filled with heat-insulating material 43 and accomodating a Peltier block 2, as described in conjunction with FIG. 1. However, instead of being mounted in an insulating partition of a container structure, the block 2 according to FIG. 9 is joined on its two heat-transfer surfaces with respective heat-valve units which comprise respective insulating containers 51 and 60 separately illustrated in FIGS. 10 and 11 respectively.

The insulating container 51 has a wall portion 55 of metal in face-to-face connection with the cold-junction side of the block 2, an electrically insulating material such as a varnish coating being interposed between the block and the plate 55. The insulating container 60 has a wall portion 63 of heat-conducting metal intimately joined in face-to-face contact with the hot-junction side of the block 2, an electrical insulator being also interposed. While thus the good heat-conducting plates 55 and 63 of the vessels 51 and 60 are in substantially direct heat contact with the corresponding heat-exchanging surfaces of the Peltier block, the two vessels have respective outer plates 53 and 65 of good heat-conducting metal from which the plate 53 on the cold side of the system borders the space 44 to be cooled whereas the plate 65 on the hot side of the system is provided with vanes 64 for better dissipation of heat to the environment.

The container 51 (FIG. 10) has substanitally prismatic shape and has its lower portion filled with heat-transfer liquid 52 such as Freon. The plate 53 is joined with fins 54 immersed in the liquid so that plate 53 with its fins constitutes an evaporator. The upper portion of the vessel 51 is filled with evaporated medium. The inner surface of the plate 55 borders this vapor space and is provided with vanes 56 of good heat-conducting metal exposed to the vapor so that the plate structure 55 forms a condenser. As mentioned, the plates 53 and 55 constitute a vacuum-type closure on respective openings of the insulating container. The plates 53 and 55 are provided with bores 57, 58 to permit fastening the unit to the hot-junction or cold-junction side of a thermoelectric block proper.

The heat-valve unit on the other side of the block 2 has substantially parallelogram-shaped lateral walls 59 (FIG. 11) so that its top wall and the botom wall 61 are inclined upwardly from the block-adjacent plate 63. The plates 63 and 65 are provided with respective groups of heat-transfer vanes on their inner side and the vessel is partly filled with heat-transfer liquid 62 to operate in the same manner as the heat-valve unit described above with the reference to FIG. 10.

If a heat-valve (rectifier) unit of the type described is employed only on the cold-junction side of a Peltier block, then when the Peltier block after preceding operation is electrically switched off, the temperature level of the block is approximately at the ambient temperature. If such a heat-valve unit is employed only on the hot-junction side of a Peltier block, and the block is switched off, the temperature level of the block is approximately at the temperature of the space being cooled and consequently lower than that of the environment. If heat-valve units according to the invention are employed on both sides of a Peltier block, as described above with reference to FIG. 9, then the block, after being switched off, assumes a temperature in a range between the cooling-space temperature and the ambient temperature.

The invention is particularly advantageous for application with Peltier devices used in cold-storage or refrigerating boxes to be employed on vehicular or transportable equipment where weight is at a premium. That is, the invention affords obtaining an effective cooling performance with equipment of much lower mass and weight than heretofore needed for equivalent performance.

Upon a study of this disclosure, it will be obvious to those skilled in the art that my invention permits of various modifications with respect to design and arrangement of components and hence can be given embodiments other than particularly illustrated and described herein, without departing from the essential features of my invention and within the scope of the claims annexed hereto.

I claim:

1. A thermoelectric device comprising a heat-insulated wall of a refrigerator cabinet structure, a thermoelectric battery block located within said wall and having its operationally hot junctions on one side and its operationally cold junctions on the opposite side of the block, container means joined with said block and forming two chambers adjacent to said respective two sides of said block, each of said chambers being disposed completely within said heat-insulated wall and being partially filled with an evaporative refrigerant medium which forms in the chamber a vapor space above a liquid space, each of said block sides being in heat-conductive relation to the medium in one of said chambers, and two heat-exchange structures joined with said container means in spaced relation to said block and in heat-conductive contact with said medium, said structures extending from within to the external side of said respective chambers, whereby heat is exchanged in each of said chambers between one of said structures and said block by evaporation and condensation of the medium, each of said containers constituting the sole means for evaporating and condensing the medium therein.

2. In a thermoelectric device according to claim 1, said container means consisting of insulating material and said two chambers having respective openings on the chamber sides remote from said block, said two heat-exchange structures comprising respective cover plates of good heat-conductive material tightly closing said openings and being in contact with said medium in said respective chambers.

3. In a thermoelectric device according to claim 1, said thermoelectric block having on its heat-receiving side a larger surface located in the adjacent one of said chambers than the block surface on the heat-dissipating side in said other chamber.

4. A thermoelectric device according to claim 1, one of said chambers having walls consisting of insulating material and having an opening on its side remote from said block, and a cover plate of good heat-conducting material tightly closing said opening and being in contact with said medium to transfer heat to the external surface of said container, whereby said container, during operation of said thermoelectric block, acts as evaporator-condenser for said medium to transfer heat between said block and said plate.

5. In a thermoelectric device according to claim 4, said plate having fin means protruding into said one chamber in contact with said medium, and fin means thermally connected with said block and also protruding into said one chamber in contact with said medium.

6. A thermoelectric device according to claim 1, said container means having a partition and forming said two chambers on opposite sides respectively of said partition, said block being mounted in said partition and having said hot-junction side in one of said chambers and said cold-junction side in said other chamber.

7. In a thermoelectric device according to claim 6, said chambers having respective openings at the chamber side remote from said partition, and said heat-exchange structures comprising respective metal plates tightly closing said openings and having surface-increasing protuberance means extending into said respective chambers in contact with said medium.

8. In a thermoelectric device according to claim 6, said block being electrically insulated in the chamber located on the heat-dissipating block side, said block having its major portion freely protruding into said other chamber on the heat-receiving block side.

9. In a thermoelectric device according to claim 6, said two chambers being displaced from each other relative to the position of said block.

10. In a thermoelectric device according to claim 6, said partition extending substantially vertically in the operative condition of the device, and said two chambers being located horizontally beside each other but at respectively different heights.

11. In a thermoelectric device according to claim 6, said partition extending at an acute angle to the adjacent top and bottom of said respective chambers.

12. A thermoelectric device according to claim 1, said one block side being in heat-conductive relation to the medium in one of said two spaces, at least one of said heat-exchange structures extending from said other space to the exterior of said container, whereby said container exchanges heat between said block and said structure by evaporation.

13. In a thermoelectric device according to claim 1, said container means consisting of insulating material and having responsive openings in two mutually opposite walls, said openings being displaced in height relative to each other, said two heat-exchange structures comprising respective cover plates of good heat-conductive material tightly closing said openings and being in contact with the medium in said respective chambers, the lower one one of said plates being in contact with the liquid phase of said medium, the upper plate being in contact substantially only with the vaporous phase of said medium, one of said two plates forming part of the respective heat-exchange structure, and said other plate being attachable to said thermoelectric block.

14. In a thermoelectric device according to claim 13, said insulating container having prismatic shape.

15. In a thermoelectric device according to claim 13, said insulating container having said plates located on parallel vertical walls, and said container having parallelogram-shaped lateral walls interconnecting said vertical walls and extending at an angle upwardly between the lower and the upper plate.

References Cited

UNITED STATES PATENTS

| | | | |
|---|---|---|---|
| 1,818,437 | 8/1931 | Stuart. | |
| 2,947,150 | 8/1960 | Roeder | 136—204 X |
| 2,949,014 | 8/1960 | Belton et al. | 136—204 X |
| 2,952,724 | 9/1960 | Fritts | 136—207 |
| 3,127,287 | 3/1964 | Henderson et al. | 136—201 |
| 3,139,734 | 7/1964 | Kuckens et al. | 162—3 |

FOREIGN PATENTS

| | | | |
|---|---|---|---|
| 1,166,596 | 11/1958 | France. | |

WINSTON A. DOUGLAS, *Primary Examiner.*

ALLEN B. CURTIS, *Examiner.*